(12) United States Patent
Huang et al.

(10) Patent No.: US 12,449,059 B2
(45) Date of Patent: Oct. 21, 2025

(54) MULTI-VALVE WATER TREATMENT DEVICE

(71) Applicant: Intex Industries Xiamen Co. Ltd., Fujian (CN)

(72) Inventors: Zhi Xiong Huang, Fujian (CN); Yong Gui Chen, Fujian (CN); Pei Lin Chen, Fujian (CN)

(73) Assignee: Intex Industries Xiamen Co. Ltd., Fujian (CN)

( * ) Notice: Subject to any disclaimer, the term of this patent is extended or adjusted under 35 U.S.C. 154(b) by 259 days.

(21) Appl. No.: 17/603,565

(22) PCT Filed: Apr. 15, 2020

(86) PCT No.: PCT/IB2020/053576
§ 371 (c)(1),
(2) Date: Oct. 13, 2021

(87) PCT Pub. No.: WO2020/212881
PCT Pub. Date: Oct. 22, 2020

(65) Prior Publication Data
US 2022/0220015 A1 Jul. 14, 2022

(30) Foreign Application Priority Data
Apr. 16, 2019 (CN) .......................... 201920515659.9

(51) Int. Cl.
*F16K 31/524* (2006.01)
*F16K 11/02* (2006.01)
*F16K 11/16* (2006.01)

(52) U.S. Cl.
CPC ...... *F16K 31/52416* (2013.01); *F16K 11/022* (2013.01); *F16K 11/166* (2013.01); *F16K 31/52491* (2013.01)

(58) Field of Classification Search
CPC .. F16K 11/166; F16K 11/022; F16K 37/0041; F16K 31/52416; F16K 31/52491; C02F 2201/005; C02F 1/686
See application file for complete search history.

(56) References Cited

U.S. PATENT DOCUMENTS

| 3,613,729 A | 10/1971 | Dora |
| 4,006,753 A * | 2/1977 | Ingram, Jr. ....... F16K 31/52491 251/331 |

(Continued)

FOREIGN PATENT DOCUMENTS

| CN | 202469079 U | 10/2012 |
| CN | 104373626 A | 2/2015 |

(Continued)

OTHER PUBLICATIONS

European Search Report for EP Patent Application No. 20790650.4, Issued on Dec. 2, 2022, 14 pages.

(Continued)

*Primary Examiner* — Hailey K. Do
(74) *Attorney, Agent, or Firm* — Faegre Drinker Biddle & Reath LLP

(57) ABSTRACT

A multi-valve water treatment system may include a motor having an output shaft, a driven shaft fixed to the output shaft and having a cam disposed at an axial position along the driven shaft, and a valve assembly. The valve assembly may include a valve actuator urged into engagement with the driven shaft at the axial position, a fluid flow housing having a fluid outlet and at least one fluid inlet selectively sealingly engaged by the valve actuator to define a valve configured to selectively allow a flow of fluid from the fluid inlet toward the fluid outlet depending on the relative positions of the (Continued)

driven shaft and the valve actuator; and a diaphragm sealingly isolating the fluid inlet of the fluid flow housing from the valve actuator.

31 Claims, 7 Drawing Sheets

(56) References Cited

U.S. PATENT DOCUMENTS

| | | | | |
|---|---|---|---|---|
| 4,241,761 A * | 12/1980 | Miller | ................... | F16K 41/103 |
| | | | | 137/884 |
| 4,846,138 A | 7/1989 | Vallejos | | |
| 5,927,332 A | 7/1999 | Richard | | |
| 5,989,425 A | 11/1999 | Yonezawa et al. | | |
| 6,994,319 B2 | 2/2006 | Yudovsky | | |
| 2015/0041006 A1 * | 2/2015 | Morishita | ................ | F16K 11/22 |
| | | | | 137/625.11 |
| 2016/0029924 A1 | 2/2016 | Leonhardt et al. | | |
| 2016/0091099 A1 * | 3/2016 | Scheibe | ................ | F16K 31/041 |
| | | | | 137/625.48 |
| 2020/0386329 A1 | 12/2020 | Sloma et al. | | |

FOREIGN PATENT DOCUMENTS

| | | | |
|---|---|---|---|
| CN | 104373635 A | 2/2015 | |
| CN | 105050501 A | 11/2015 | |
| CN | 108223843 A | 6/2018 | |
| CN | 208417683 U | 1/2019 | |
| CN | 209977340 U | 1/2020 | |
| EP | 0774605 A1 | 5/1997 | |
| EP | 3366651 A1 | 8/2018 | |
| FR | 2373737 | 7/1978 | |
| JP | 3972112 B1 * | 9/2007 | ............. C02F 1/003 |

OTHER PUBLICATIONS

International Preliminary Report on Patentability received for PCT Patent Application No. PCT/IB2020/053576, mailed on Oct. 28, 2021, 7 pages.
International Search Report, National Intellectual Property Administration of China, PCT/IB2020/053576, Jul. 8, 2020, 3 pages.
Written Opinion of the International Searching Authority, Patent Cooperation Treaty, PCT/IB2020/053576, Jul. 24, 2020, 6 pages.

* cited by examiner

MULTI-VALVE WATER TREATMENT DEVICE

CROSS REFERENCE TO RELATED APPLICATION

This application is a national stage application of PCT International Application No. PCT/IB2020/053576, filed Apr. 15, 2020, which claims priority to Chinese Application Serial No. 201920515659.9, filed Apr. 16, 2019, the disclosures of which are hereby expressly incorporated by reference herein in their entirety.

BACKGROUND

1. Field of the Disclosure

The invention relates to water treatment devices, in particular to a multi-path valve assembly for use in a pool water treatment device.

2. Description of the Related Art

Pool water conditions, if left unchecked, can render the pool water unsuitable for swimmers. For example, untreated pool water can become a habitat for bacteria and algae which can endanger the health of swimmers. Bacteria and algae accumulation can also have aesthetic consequences, such as discoloration of water and in some cases, odors. pH levels in pool water are also important. Chemical additives that help prevent bacteria and algae accumulation can alter the pH of pool water. If the water becomes too basic or acidic, it can also render the water unsuitable for swimmers. Chemicals commonly used in pools include disinfectants, coagulants, pH adjusters, algaecides, etc.

These chemicals may be used in conjunction with each other and may require diligent care and attention while dealing with them. While sanitizing a pool with unclean water, or performing preventative maintenance, each of the chemicals used will require a different amount, need monitoring in a different way, and will need to be applied more or less than the others. For example, a common disinfectant for pool water is chlorine. Chlorine can be applied in a diluted liquid form, in a solid form as a dissolvable tablet, or in a gaseous form. Each form of application presents its own challenges because chlorine is not suitable for humans and pets in high concentrations.

Additionally, if these chemicals are mixed before application to the pool water, they could react and damage equipment or the pool itself. Each chemical needs its own dosing system to assure safety, and accuracy when performing routine maintenance of pools.

SUMMARY

The present disclosure provides a multi-valve water treatment system which facilitates precise delivery of water treatment substances to a pool or other bathing enclosure. The water treatment system uses an arrangement of valves operated by a cam shaft and motor, such that actuation of the motor selectively opens respective valves to allow selected water treatment substances to flow. A diaphragm is used to isolate the cam shaft and valve structures from the fluid flow paths.

In one form thereof, the present disclosure provides a multi-valve water treatment system including: a motor having an output shaft; a driven shaft fixed to the output shaft such that the driven shaft is driven by the motor when the motor is activated, the driven shaft having a cam disposed at an axial position along the driven shaft; and a valve assembly. The valve assembly includes: a valve actuator urged into engagement with the driven shaft at the axial position, such that the valve actuator is moved axially upon engagement with the cam; a fluid flow housing having a fluid outlet and at least one fluid inlet selectively sealingly engaged by the valve actuator to define a valve configured to selectively allow a flow of fluid from the fluid inlet toward the fluid outlet depending on the relative positions of the driven shaft and the valve actuator; and a diaphragm sealingly isolating the fluid inlet of the fluid flow housing from the valve actuator.

In another form thereof, the present disclosure provides a multi-valve water treatment system including: a motor; a driven shaft drivingly coupled to the motor; a fluid housing having a plurality of fluid inlets positioned to discharge to a common fluid flow chamber, and a fluid outlet positioned to receive a single flow from the fluid flow chamber, each of the plurality of fluid inlets coupled to a source of a water treatment substance; a multi-valve assembly including a plurality of valves respectively fluidly connected to the plurality of fluid inlets, the driven shaft configured to activate and deactivate each of the plurality of valves; and a controller operably connected to the motor and programmed to activate and deactivate the plurality of valves by rotation of the driven shaft.

In yet another form thereof, the present disclosure provides a multi-valve water treatment system including: a housing; a motor; a driven shaft disposed within the housing and configured to be driven by the motor; and a multi-valve assembly. The multi-valve assembly includes: a plurality of valve actuators disposed within the housing and around the driven shaft; a plurality of valve rods extending below the housing, each coupled to one of the plurality of valve actuators and having a spring biasing the plurality of valve rods away from the valve actuators against the housing; a plurality of chemical inlets at an end of the plurality of valve rods; and a diaphragm disposed between the plurality of valve rods and the plurality of chemical inlets and positioned to individually seal each of the plurality of chemical inlets, the diaphragm coupled to each of the plurality of valve rods such that movement of one of the plurality of valve rods causes resilient deformation of the diaphragm. The driven shaft defines a plurality of rotational positions including a first position in which a first one of the plurality of valve actuators is urged away from an adjacent first one of the plurality of chemical inlets by the driven shaft and against a bias of the spring, such that the diaphragm resiliently deforms to open a corresponding first one of the plurality of chemical inlets.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

DETAILED DESCRIPTION

Figure 1:
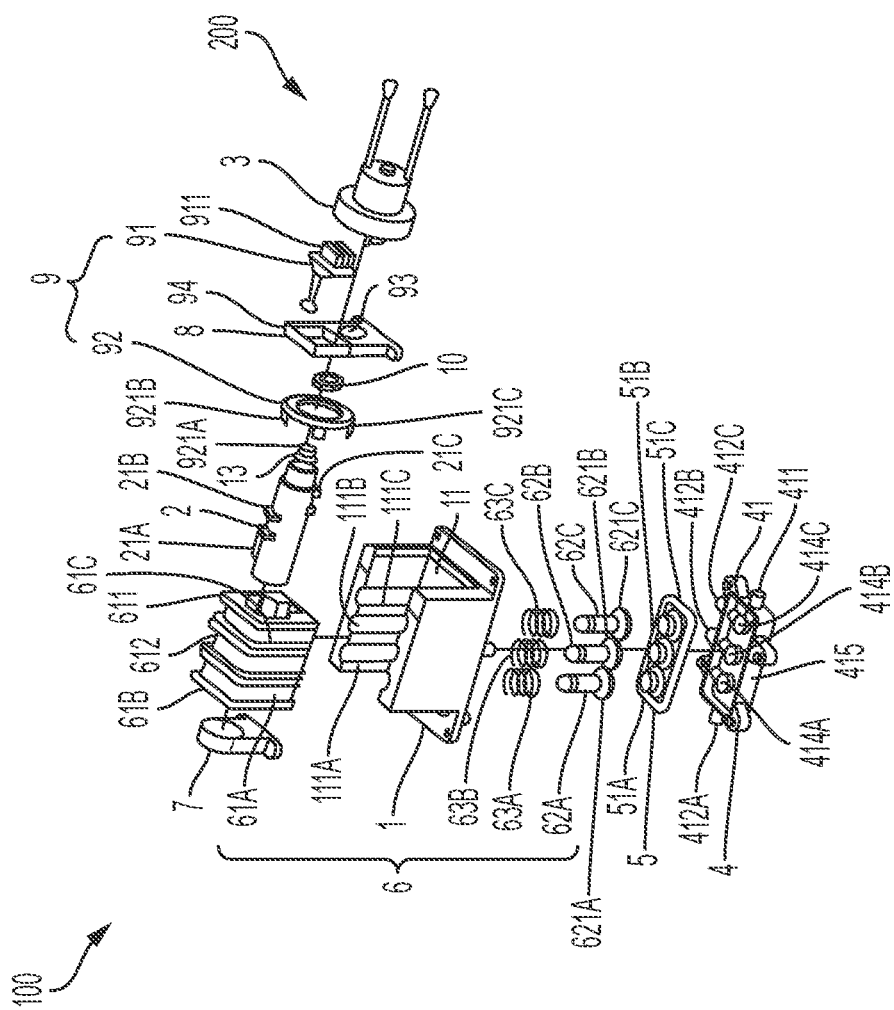
FIG. 1 is an exploded view of a multi-valve water treatment device made in accordance with the present disclosure.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

FIG. 1 illustrates an exemplary embodiment of a water treatment device 100 having multiple valve systems. As shown in FIG. 1 and described in detail below, water treatment device 100 includes a fluid flow housing or base 4, a diaphragm 5, a multi-valve assembly 6, and a control assembly 200 which cooperate to actuate valved flow paths to selectively allow or prohibit chemical flows through device 100.

Figure 3:
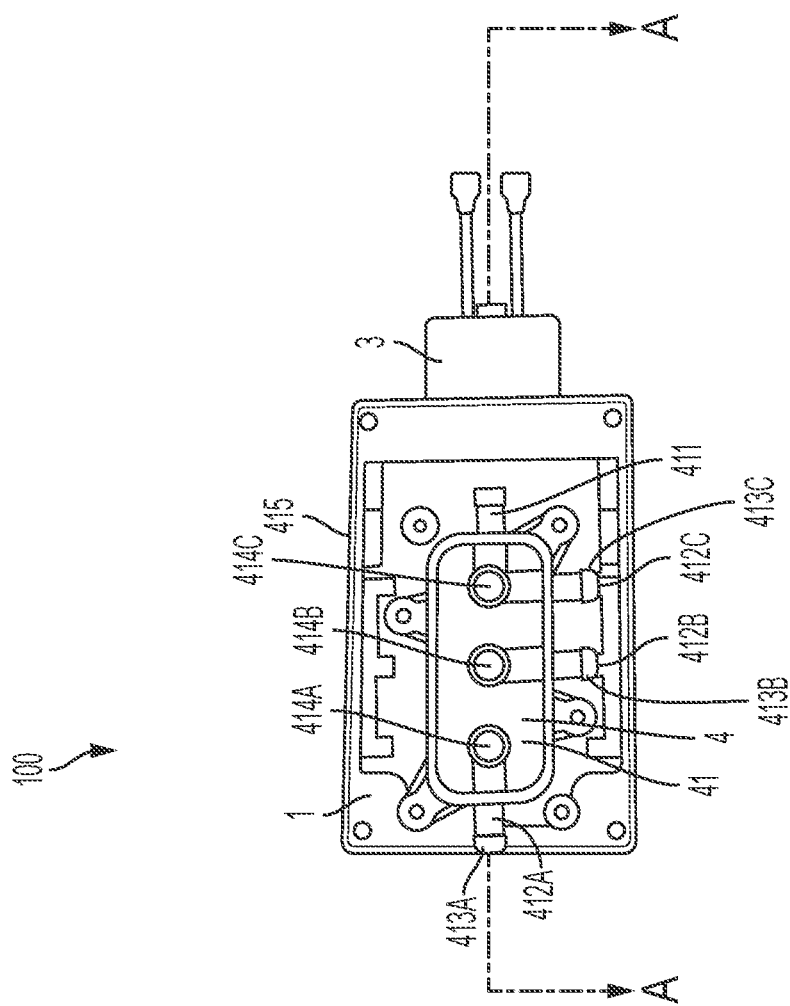
FIG. 3 is a bottom plan view of the multi-valve water treatment device of FIG. 1.

Referring to FIGS. 1 and 3, base 4 includes inlets 412A, 412B, 412C which all discharge to a common fluid flow chamber 41, and an outlet 411 which receives a single flow from the fluid flow chamber 41. This single flow may be a mixture of different fluids discharged by one or more of the inlets 412A, 412B, 412C. Base 4 rests on a horizontal plane and has a side wall 415 that extends around the perimeter of base 4 to define fluid flow chamber 41. Outlet 411 is defined by an aperture in side wall 415 of base 4. In an exemplary embodiment, outlet 411 is configured to fluidly couple to a hose connector, or may discharge directly into the pool. For example, Inlets 412A, 412B, 412C may each include a barbed connector 413A, 413B, 413C (FIG. 3) on the outside of base 4, that leads into fluid flow chamber 41. Inlets 412A, 412B, 412C lead into fluid flow chamber 41 along a horizontal flow path, then make a 90-degree turn to a vertical flow path to terminate at openings 414A, 414B, 414C. Openings 414A, 414B, 414C extend vertically up to a height substantially the same as side wall 415 and lead out into fluid flow chamber 41. Inlets 412A, 412B, 412C are higher than outlet 411 such that inlets 412A, 412B, 412C are positioned to sealingly engage with diaphragm 5. As further described below, this arrangement ensure that fluid will drain out of fluid flow chamber 41 and not drain back through inlets 412A, 412B, 412C when the valves are closed (FIG. 4).

Figure 4:
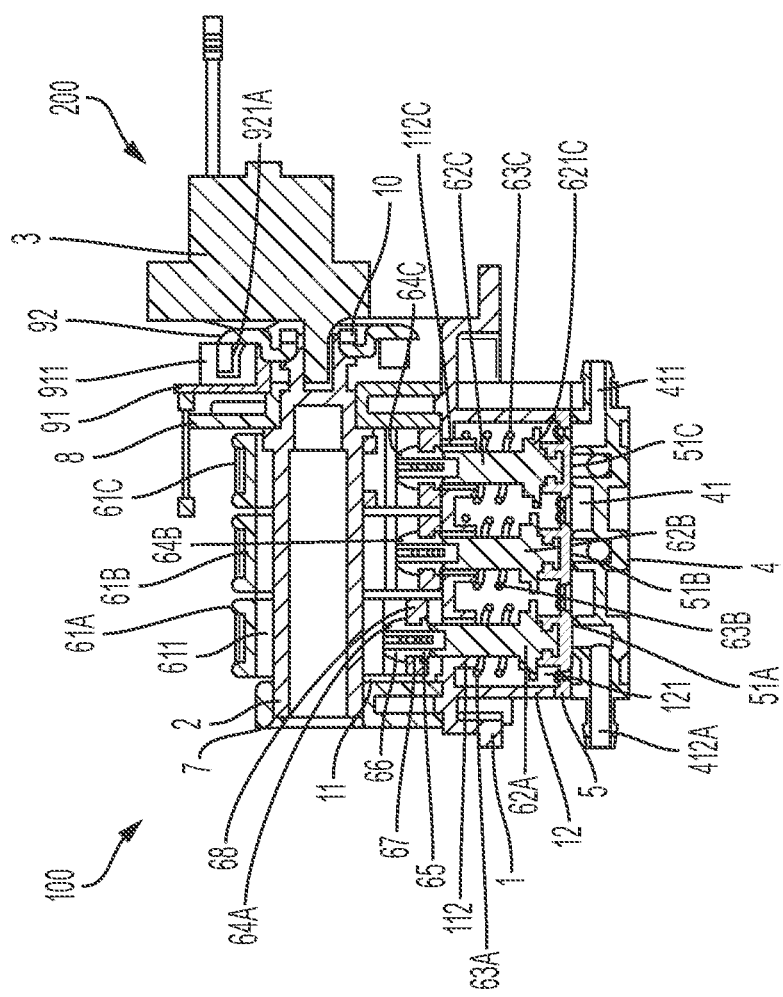
FIG. 4 is an elevation, cross-sectional view of the multi-valve water treatment device, taken along line A-A of FIG. 3, shown with all valves closed.
Figure 5:
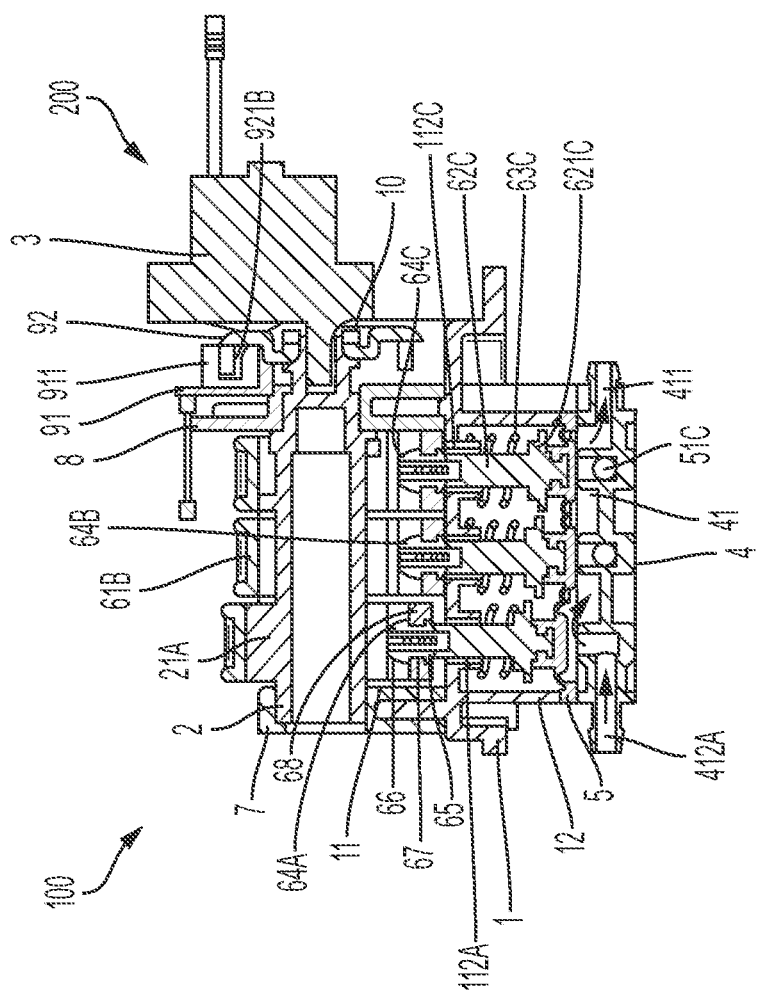
FIG. 5 is another elevation, cross-sectional view of the multi-valve water treatment device, taken along line A-A of FIG. 3, shown with a first valve open.
Figure 6:
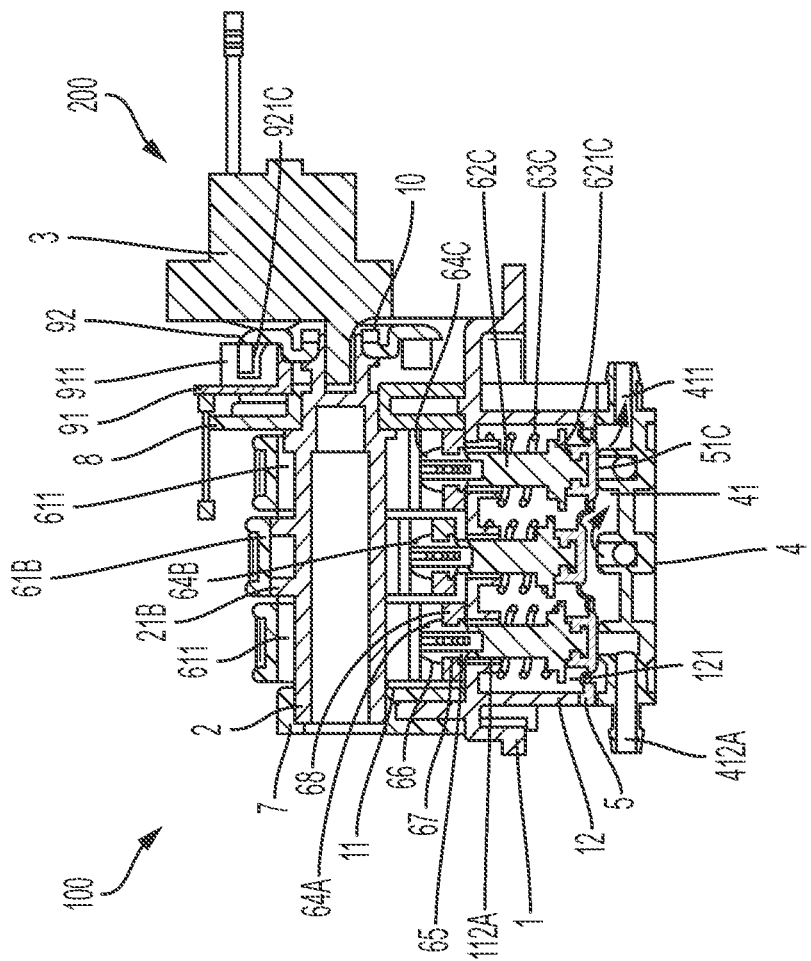
FIG. 6 is another elevation, cross-sectional view of the multi-valve water treatment device, taken along line A-A of FIG. 3, shown with a second valve open.
Figure 7:
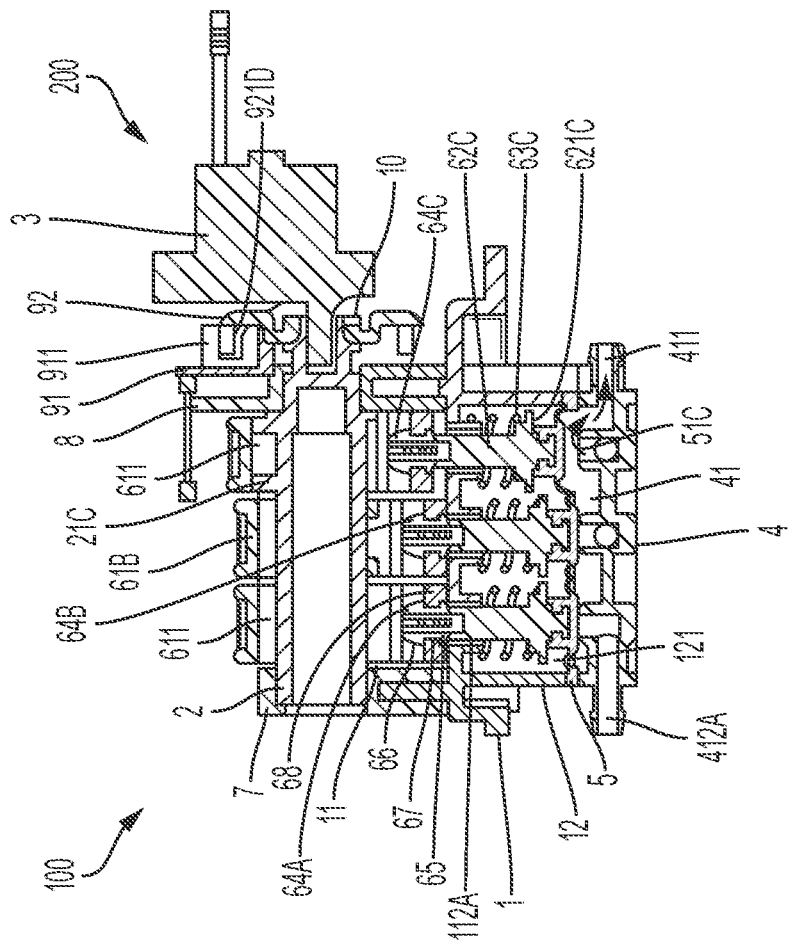
FIG. 7 is yet another elevation, cross-sectional view of the multi-valve water treatment device, taken along line A-A of FIG. 3, shown with a third valve open.

As shown in FIGS. 1, and 4-7, diaphragm 5 is sealingly attached to the top of side wall 415 of base 4. Diaphragm 5 is made of a flexible material such a rubber or a soft plastic which can provide a fluid-tight seal between chamber 41 and the ambient area around device 100, and also selectively seal openings 414A, 414B, 414C. In an exemplary embodiment, diaphragm is made from a chemically-resistant material that can resist corrosion or corruption due to exposure to chemicals commonly used to clean pool water. Optionally, diaphragm 5 may be made of two different materials, such as a hard plastic for the non-moving parts, and a flexible material for the moving (i.e., deformable) parts. Diaphragm 5 also includes valve portions 51A, 51B, 51C. As shown in FIGS. 1 and 3, valve portions 51A, 51B, 51C correspond and align with openings 414A, 414B, 414C of inlets 412A, 412B, 412C, which act as valve seats. Valve portions 51A, 51B, 51C are configured to be moved up or down to disengage and reengage with openings 414A, 414B, 414C. At rest, and as can be seen in FIG. 4, valve potions 51A, 51B, 51C are in sealing engagement with openings 414A, 414B, 414C. FIGS. 5-7 each show a different one of valve portions 51A, 51B, 51C in an activated, or disengaged, configuration with respect to its corresponding opening 414A, 414B, 414C.

As shown in FIG. 1, multi-valve assembly 6 of water treatment device 100 includes valve rods 62A, 62B, 62C, springs 63A, 63B, 63C, housing 1, and actuators 61A, 61B, 61C. Valve rods 62A, 62B, 62C extend vertically up from diaphragm 5, with the lower ends of valve rods 62A, 62B, 62C respectively coupled to valve portions 51A, 51B, 51C. In the illustrated embodiment, each valve portion 51A, 51B, 51C includes a molded cavity which captures a correspondingly shaped lower end of each valve rod 62A, 62B, 62C such that vertical movement of valve rods 62A, 62B, 62C causes valve portions 51A, 51B, 51C to also move vertically and disengage from openings 414A, 414B, 414C of inlets 412A, 412B, 412C. Directly above this captured coupling between valve rods 62A, 62B, 62C and valves 51A, 51B, 51C, are flanges 621A, 621B, 621C. Each flange 621A, 621B, 621C is a radial extension from the otherwise cylindrical valve rods 62A, 62B, 62C that provide a lower shoulder upon which springs 63A, 63B, 63C bear. Above flanges 621A, 621B, 621C, a relatively smaller cross-sectional area (e.g., a round area creating the illustrated cylindrical surface) is sized to allow each valve rod 62A, 62B, 62C to extend through housing apertures 112A, 112B, 112C and to be vertically moveable therethrough for a range of motion. Springs 63A, 63B, 63C are disposed around this smaller cross-sectional portion of valve rods 62A, 62B, 62C and are captured between flanges 621A, 621B, 621C and the lower inner surface of housing 1 to provide a downward biasing force onto valve rods 62A, 62B, 62C.

As shown in FIGS. 4-7, within housing 1, valve rods 62A, 62B, 62C include locking members 64A, 64B, 64C. Locking members 64A, 64B, 64C each include a wide base 65 and a wide top 66 with a circular slot 67 therebetween. Locking members 64A, 64B, 64C are fixed to the upper end of valve rods 62A, 62B, 62C (e.g., by a threaded connection), and are vertically fixed to actuators 61A, 61B, 61C via slots 67. In the illustrated embodiment, each wide top 66 can be resiliently deformed inwardly to pass through the adjacent catch 68, and the allowed to "snap" back outwardly when slot 67 registers with catch 68. At this point, the respective valve rod 62A, 62B, 62C is vertically coupled to its actuator 61A, 61B, 61C, such that upward movement of an actuator 61A, 61B, 61C also moves valve rod 62A, 62B, 62C upwardly, thereby lifting the respective valve portion 51A, 51B, 51C to open the valve. In the illustrated embodiment, each wide top 66 is tapered to assist in the initial engagement of locking members 64A, 64B, 64C with its adjacent catch 68.

Figure 2:
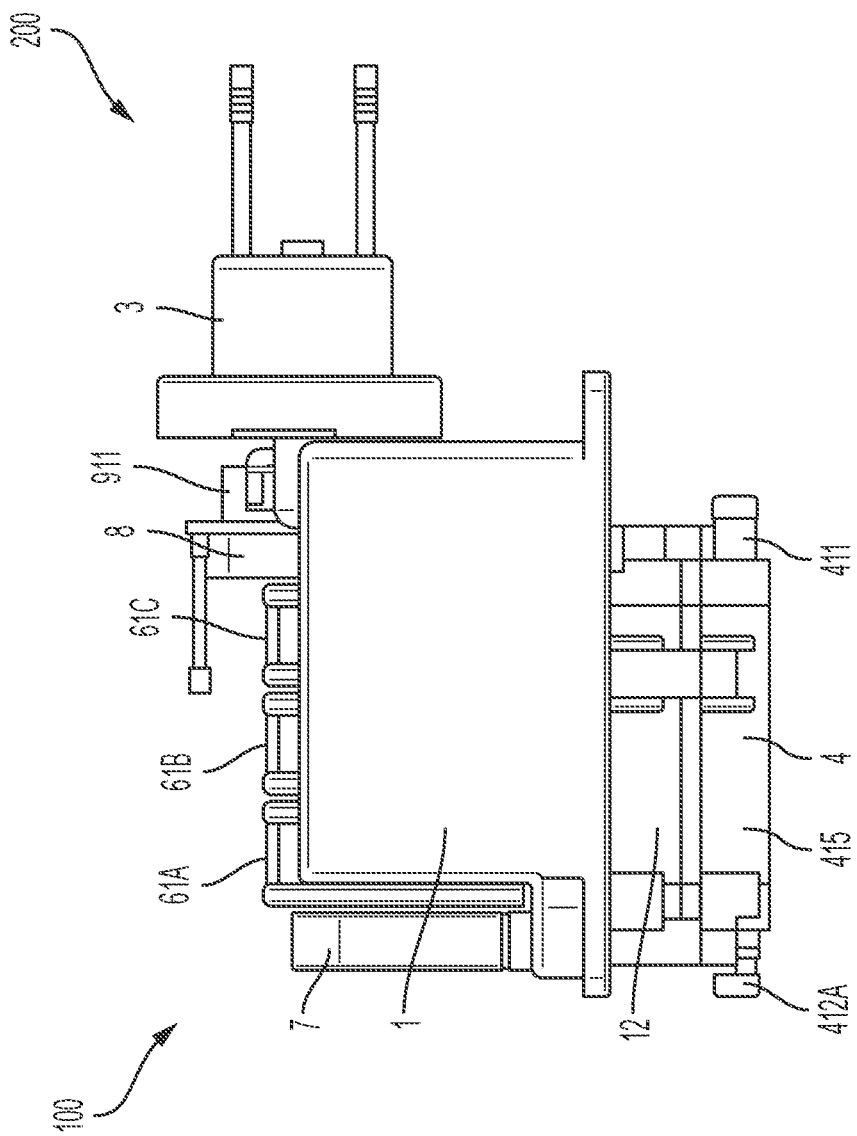
FIG. 2 is a front elevation view of the multi-valve water treatment device of FIG. 1.

As best seen in FIGS. 1 and 2, multi-valve assembly 6 also includes housing 1. Housing 1 has a base and two vertical walls that define a chamber 11 (FIG. 1). Each of the vertical walls includes actuator rails 111A, 111B, 111C which protrude from the inside face of each vertical wall and define a convex profile. Actuator rails 111A, 111B, 111C are configured to slidably receive actuators 61A, 61B, 61C. In particular, actuators 61A, 61B, 61C include grooves 612 at their outer surfaces that are concave and correspondingly shaped to rails 111A, 111B, 111C, such that actuators 61A, 61B, 61C slidably engage the respective actuator rails 111A, 111B, 111C within chamber 11 of housing 1. The shape and clearance fit between actuator rails 111A, 111B, 111C and housing grooves 612 allow actuators 61A, 61B, 61C to slide vertically within chamber 11, and without substantially moving in a horizontal direction. Each actuator 61A, 61B, 61C can move vertically relative to the others in this manner.

The inner portion of each actuator 61A, 61B, 61C includes an aperture 611 sized to receive driven shaft 2. Referring to FIG. 1, each aperture 611 is generally round in cross-section, but is interrupted by a notch at its lower end and a flat at its upper end. The notch of each aperture 611 can receive cams 21A, 21B, 21C as further described below to facilitate assembly, while the flat at of each aperture 611 engages the respective cams 21A, 21B, 21C during operation of water treatment device 100, as also described below. Together, the apertures 611 extend throughout the multiple actuators 61A, 61B, 61C and span the length of chamber 11.

Referring still to FIG. 1, control assembly 200 of water treatment device 100 includes driven shaft 2 which spans the length of apertures 611 and is rotatably supported by first end cap 7 and second end cap 8. In an exemplary embodiment, end caps 7,8 are bearings which facilitate smooth rotation of shaft 2. First end cap 7 is fixed to the lower wall or base at one end of housing 1, while second end cap 8 is fixed to the lower wall or base at one end of housing 1.

A plurality of cams 21A, 21B, 21C extending radially from driven shaft 2, but are spaced axially from one another and placed at different angular orientations relative to one another. Cams 21A, 21B, 21C are configured to engage with the inner flat surface of the top of apertures 611, such that the engagement drives actuators 61A, 61B, 61C in a vertical direction as further described below with reference to FIGS. 4-7. The axial and angular spacing of cams 21A, 21B, 21C ensures that only one actuator 61A, 61B, 61C is activated at a time. In the illustrated embodiment, cam 21A is a solid structure while cams 21B and 21C are formed from two insets (FIG. 1). This may facilitate manufacture of driven shaft 2, though other cam designs may of course be used as required or desired for a particular application.

Also shown in FIG. 1, the driven end of driven shaft 2 (i.e., the end portion supported by end cap 8) extends outside of housing 1 and is configured to receive and couple to locator plate 92 via fastener 10. Locator plate 92 includes a plurality of locators 921A, 921B, 921C, 921D which respectively correspond to the shaft positions which provide closed valves (FIG. 4) and respectively opened valves (FIGS. 5-7) as further described below.

Second end cap 8 includes aperture 93 and detector mount 94. Aperture 93 supports the end of driven shaft 2, as noted above. Detector mount 94 receives detector 91 and allows detector 91 to be fixed in position near shaft 2 and locator plate 92. Detector 91 includes photosensor 911. Photosensor 911 is configured to detect the presence or absence of locators 921A, 921B, 921C, 921D, and in some embodiments, may also distinguish between the various locators 921A, 921B, 921C, 921D. In this way, detector 91 is configured to sense the presence of a particular one of locators 921A, 921B, 921C, 921D, and thereby issue a signal that indicates whether and which of the valves 51A, 51B, 51C are open. As described in detail below, this signal may also be used by a controller to calculate how much rotation of the driven shaft 2 is needed to reconfigure the valves 51A, 51B, 51C into a desired open or closed state.

Motor 3 includes an output shaft drivingly coupled to driven shaft 2. During operation, motor 3 is activated to driven shaft 2 and locator plate 92 to rotate synchronously. As each locator 921A, 921B, 921C, 921D passes through photosensor 911, photosensor 911 issues a signal via the electrical cable of detector 91 to a user interface and/or controller. For example, a controller may be calibrated upon initial assembly or installation of water treatment device 100 to initiate its program in a known rotational orientation of shaft 2, such as the "all-valves-closed" orientation shown in FIG. 4 where locator 921A is in registration with photosensor 911. When motor 3 activates to rotate shaft 2 in a known direction, the signal from photosensor 911 indicating presence of locator 921A is eliminated as locator 921A passes out of registration. The controller may then be programmed to await the next signal indicating presence of a locator and, when the locator is sensed, then it may be inferred that the next locator—i.e., locator 921B—is in registration with photosensor 911. The same process may be repeated to serially infer the presence of locator 921C, locator 921D, and then locator 921A again. Alternatively, photosensor 911 may be any other kind of sensor, including a sensor which can distinguish between the various locators 921A, 921B, 921C, 921D (e.g., by color, QR code, or any other suitable method). This may result in the signal from photosensor 911 providing a direct indication of which locator 921A, 921B, 921C, 921D is present.

In this way, the controller can select which valve 51A, 51B, 51C needs to be opened or closed, such as in response to a user or program input signal. Upon such selection, motor 3 may be activated or deactivated until the signals received from photosensor 911 and/or the programming logic indicate that the desired configuration has been achieved. This may be used to control the operation of motor 3 to precisely open and close any individual valve 51A, 51B, 51C of water treatment device 100.

In addition, water treatment device 100 can cooperate with the controller to provide automated operation. For example, a timer may be used to calculate the elapsed time between water treatment operations, such that water treatment operations may automatically occur after a given time interval. Alternatively, water quality sensors may provide signals to the controller which are indicative of water quality, such as turbidity or composition. When the water quality reaches a threshold level, the controller may activate water treatment device 100 to automatically remediate the quality issue. Further, water treatment device 100 may take one action (e.g., opening a first valve) for one type of detected problem, and take another action (e.g., opening a second valve different from the first valve) for another, different type of detected problem.

As shown by a comparison of FIGS. 4-7, in one embodiment, water treatment device 100 includes three valves 51A, 51B, 51C, any one of which (or none of which) may be opened independently. During operation, a water treatment chemical solution, or fluid container or supply may be hooked up to each of inlets 412A, 412B, 412C such that each valve 51A, 51B, 51C results in a different water treatment.

FIG. 4 shows water treatment device 100 in a closed configuration in which each of valves 51A, 51B, 51C are closed. Locator 921A is in registration with photosensor 911 such that a signal emitted by detector 91 indicates "all valves closed."

Turning to FIG. 5, water treatment device 100 is shown with a "first valve open" configuration in which valve 51A is open and valves 51B and 51C are closed. To transition from the "all valves closed" configuration of FIG. 4 to the first valve open" configuration shown in FIG. 5, motor 3 activates to rotate driven shaft 2. Upon such rotation of driven shaft 2, cam 21A also rotates. When driven shaft 2 rotates by a certain angle, cam 21A abuts against the inside surface of the receiving aperture 611 of actuator 61A. Cam 21A therefore pushes actuator 61A to move vertically upwardly, which in turn lifts valve rod 62A against the bias force of spring 63A. As valve rod 62A rises vertically, valve rod 62A lifts valve 51A, opening inlet 412A so that a water treatment substance or fluid, such as a water treatment chemical solution, is allowed to flow from a source of the substance, through inlet 412A into fluid flow chamber 41 where it may mix with other flow, and then through outlet 411 into a pool or body of water to be treated. When cam 21A reaches its peak, and actuator 61A is raised vertically as high as it will go, valve 51A is completely open. In this configuration, locator 921B corresponding is located within and registered with the detection zone of photosensor 911. If valve 51A is the desired valve from 51A, 51B, 51C to be opened, this will signal detector 91 to stop rotation of motor 3.

Conversely, and as shown in FIG. 6, if valve 51B is desired to be open, further rotation of motor 3 will be signaled by the controller. As the locator 921B that corresponds to the open configuration of valve 51A moves out of the detection zone of photosensor 911, detector 91 will issue a signal (which may be the elimination of a formerly present signal) that valve 51A is closing. As shaft 2 continues to rotate, cam 21A will disengage with the flat of the aperture 611 to allow actuator 61A to lower under the force of spring 63A to pull down valve rod 62A and close valve 51A. Upon further activation of motor 3 to rotate driven shaft 2, cam 21B engages with actuator 61B and the process of opening valve 51B will operate the same as the opening of valve 51A. In the same way, locator 921C will then move into the detection zone of photosensor 911 communicating to detector 91 that valve 51B is opening.

The same process of continued rotation and monitoring for locator 921D by detector 91 may also be used to open valve 51C and close valves 51A and 51B, as shown in FIG. 7.

In the illustrated embodiment, driven shaft 2 includes three sets of cams 21A, 21B, 21C that are spaced circumferentially around driven shaft 2 about 90° from one another. If the desired configuration of the present water treatment device 100 is as shown in FIG. 4, and all valves 51A, 51B, 51C are closed, then rotation of driven shaft 2 about 90° from this closed configuration will open the first valve 51A. Another 90° of rotation will close the first valve 51A and open the second valve 51B. Yet another 90° of rotation will close the second valve 51B and open the third valve 51C.

In other embodiments, driven shaft 2 may include any number of cams, such as two sets of cams 21A, 21B which are spaced circumferentially around driven shaft 2 about 180°, which would be sufficient to drive two valves between respective open and closed states. Moreover, any number of sets of cams can be used, such as one set for one valve, four sets for four valves, or any other configuration.

A distinct advantage of the present system is that the chemicals distributed into the water supply through the present water treatment device 100 only flow within fluid flow chamber 41 and diaphragm 5. The chemicals never come into contact with any other parts of the present water treatment device 100. This is particularly advantageous for the delivery of chemicals that are not suitable for human contact in high concentrations, because such chemicals would only be found in high concentrations in one, sealed location which need not be accessed by a user except through a controller.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:
1. A multi-valve water treatment system comprising:
a motor having an output shaft;
a driven shaft fixed to the output shaft such that the driven shaft is driven by the motor when the motor is activated, the driven shaft having a cam disposed at an axial position along the driven shaft; and
a valve assembly including:
a valve actuator urged into engagement with the driven shaft at the axial position, such that the valve actuator is moved axially upon engagement with the cam, the valve actuator comprising an aperture configured to receive the driven shaft;
a fluid flow housing having a fluid outlet and at least one fluid inlet selectively sealingly engaged by the valve actuator to define a valve configured to selectively allow a flow of fluid from the at least one fluid inlet toward the fluid outlet depending on the relative positions of the driven shaft and the valve actuator; and
a diaphragm sealingly isolating the fluid inlet of the fluid flow housing from the valve actuator;
wherein the diaphragm is fixedly coupled to the valve actuator such that diaphragm remains fixed to the valve actuator over all operating positions of the driven shaft.
2. The multi-valve water treatment system of claim 1, further comprising a controller programmed to actuate the driven shaft in response to an input signal, such that the controller allows or prevents the flow of fluid through the fluid flow housing.
3. The multi-valve water treatment system of claim 1, further comprising a housing, the driven shaft and the valve actuator at least partially disposed within the housing.
4. The multi-valve water treatment system of claim 3, wherein the valve actuator includes concave grooves and the housing includes correspondingly convex rails, the concave grooves and the convex rails configured to slidably engage with one another.
5. The multi-valve water treatment system of claim 4, wherein the valve assembly includes a plurality of the valve actuator and a plurality of the valve, each of the plurality of valves actuated by a respective one of the plurality of valve actuators.
6. The multi-valve water treatment system of claim 5, wherein the fluid flow housing includes a plurality of fluid inlets, each corresponding to a respective one of the plurality of valve actuators to define the plurality of valves.

7. The multi-valve water treatment system of claim 6, wherein the valve assembly further includes a plurality of valve rods, each corresponding to a respective one of the plurality of valve actuators and extending between the driven shaft and a respective one of the plurality of fluid inlets.

8. The multi-valve water treatment system of claim 7, wherein each of the plurality of valves includes a flange on its valve rod and a spring, the flange protruding in a radial direction outwardly from the valve rod, and the spring captured between the flange and a bottom side of the housing to provide a biasing force on the valve rod.

9. A multi-valve water treatment system comprising:
a motor;
a driven shaft drivingly coupled to the motor;
a fluid housing having a plurality of fluid inlets positioned to discharge to a common fluid flow chamber, and a fluid outlet positioned to receive a single flow from the fluid flow chamber, each of the plurality of fluid inlets coupled to a source of a water treatment substance;
a multi-valve assembly including a plurality of valves respectively fluidly connected to the plurality of fluid inlets, the driven shaft releasably engaged with the plurality of valves and configured to activate and deactivate each of the plurality of valves, wherein the multi-valve assembly is configured to form a mixed flow of fluid from at least two of the plurality of fluid inlets such that the common fluid flow chamber provides the mixed flow of fluid to the fluid outlet;
wherein each of the plurality of valves includes a spring positioned between the driven shaft and the plurality of fluid inlets, the spring of each of the plurality of valves configured to produce a force when the valve is activated and produce a force when the valve is deactivated; and
a controller operably connected to the motor and programmed to activate and deactivate the plurality of valves by rotation of the driven shaft.

10. The multi-valve water treatment system of claim 9, further comprising a housing, wherein the multi-valve assembly and the driven shaft are at least partially disposed within the housing.

11. The multi-valve water treatment system of claim 10, wherein each of the plurality of valves further includes a valve actuator engaged with the driven shaft and a valve rod engaged with one of the plurality of fluid inlets.

12. The multi-valve water treatment system of claim 11, wherein each valve actuator includes a concave groove and the housing includes correspondingly convex rails, the concave grooves and the convex rails configured to slidably engage with one another.

13. The multi-valve water treatment system of claim 12, wherein each of the plurality of valves includes a flange on its valve rod, the flange protruding in a radial direction outwardly from the valve rod, and the spring captured between the flange and a bottom side of the housing to provide a biasing force on the valve rod.

14. The multi-valve water treatment system of claim 9, further comprising a locator plate coupled to the driven shaft and a detector positioned to detect rotation of the locator plate, the detector operably coupled to the controller.

15. The multi-valve water treatment system of claim 14, wherein the locator plate has a plurality of identifiers that correspond to rotational positions of the driven shaft, one of the plurality of identifiers corresponding to a first position of the driven shaft in which one of the plurality of valves is open, and another of the plurality of identifiers corresponding to a second position of the driven shaft in which all of the plurality of valves are closed.

16. The multi-valve water treatment system of claim 14, wherein the detector comprises a photosensor.

17. The multi-valve water treatment system of claim 16, wherein the photosensor is configured to issue a signal indicative of the presence or absence of any of the plurality identifiers.

18. The multi-valve water treatment system of claim 17, wherein the controller is programmed to determine a configuration of the plurality of valves based on the signal.

19. The multi-valve water treatment system of claim 18, wherein the controller is programmed to distinguish between a valve-open and a valves-closed configuration based on the signal.

20. The multi-valve water treatment system of claim 9, further comprising a valve rod engaged with each one of the plurality of fluid inlets, wherein a flow area distance between each valve rod and respective plurality of inlets is proportional to a position of each valve rod over all operating positions of the valve rod.

21. The multi-valve water treatment system of claim 9, wherein the common fluid flow chamber includes a floor and each of the respective plurality of fluid inlets includes a raised lip extending from the floor.

22. A multi-valve water treatment system comprising:
a housing;
a motor;
a driven shaft disposed within the housing and configured to be driven by the motor; and
a multi-valve assembly including:
a plurality of valve actuators disposed within the housing and around the driven shaft;
a plurality of valve rods extending below the housing, each coupled to one of the plurality of valve actuators and having a spring biasing the plurality of valve rods away from the valve actuators against the housing;
a plurality of chemical inlets at an end of the plurality of valve rods; and
a diaphragm disposed between the plurality of valve rods and the plurality of chemical inlets and positioned to individually seal each of the plurality of chemical inlets, the diaphragm coupled to each of the plurality of valve rods such that movement of one of the plurality of valve rods causes resilient deformation of the diaphragm,
the driven shaft defining a plurality of rotational positions including a first position in which a first one of the plurality of valve actuators is urged away from an adjacent first one of the plurality of chemical inlets by the driven shaft and against a bias of the spring, such that the diaphragm resiliently deforms to open a corresponding first one of the plurality of chemical inlets.

23. The multi-valve water treatment system of claim 22, wherein the plurality of rotational positions of the driven shaft includes a second position in which a second one of the plurality of valve actuators is urged away from an adjacent second one of the plurality of chemical inlets by the driven shaft and against the bias of the spring, such that the diaphragm resiliently deforms to open a corresponding second one of the plurality of chemical inlets.

24. The multi-valve water treatment system of claim 23, wherein the plurality of rotational positions of the driven shaft including a closed position in which all of the plurality of valve actuators is allowed to engage with the respective plurality of inlets under the biasing force of the respective springs, such that the diaphragm maintains all of the plurality of chemical inlets in a closed configuration.

25. A multi-valve water treatment system comprising:
a motor having an output shaft;
a driven shaft fixed to the output shaft such that the driven shaft is driven by the motor when the motor is activated, the driven shaft having a plurality of spaced apart cams disposed at respective axial positions along the driven shaft; and
a valve assembly including:
a fluid flow housing having a fluid outlet and a plurality of fluid inlets,
a plurality of valve actuators, and
a diaphragm sealingly isolating the plurality of fluid inlets of the fluid flow housing from the plurality of valve actuators,
wherein the plurality of valve actuators includes a first valve actuator and a second valve actuator,
the first valve actuator having a first position wherein a first fluid inlet of the plurality of fluid inlets is in fluid communication with the fluid outlet and a second position wherein the first fluid inlet is sealed by the diaphragm, the first valve actuator being moved by a first cam of the plurality of spaced apart cams from the first position to the second position, and
the second valve actuator having a third position wherein a second fluid inlet of the plurality of fluid inlets is in fluid communication with the fluid outlet and a fourth position wherein the second fluid inlet is sealed by the diaphragm, the second valve actuator being moved by a second cam of the plurality of spaced apart cams from the third position to the fourth position,
wherein the diaphragm is coupled to first valve actuator when the first valve actuator is in the first position and the second valve actuator is in the fourth position and is coupled to the second valve actuator when the first valve actuator is in the second position and the second valve actuator is in the third position, and
wherein the diaphragm includes first portion coupled to move with the first valve actuator, a second portion coupled with the second valve actuator, and a base portion extending between the first portion and the second portion, and wherein movement of the first valve actuator to the first position when the second valve actuator remains in the fourth position causes resilient deformation of the base portion of the diaphragm.

26. The multi-valve water treatment system of claim 25, wherein the diaphragm is coupled to first valve actuator in both the first position and the second position and to the second valve actuator in both the third position and the fourth position.

27. A multi-valve water treatment system comprising:
a motor;
a driven shaft drivingly coupled to the motor;
a fluid housing having a plurality of fluid inlets positioned to discharge to a common fluid flow chamber, and a fluid outlet positioned to receive a single flow from the fluid flow chamber, each of the plurality of fluid inlets coupled to a source of a water treatment substance;
a multi-valve assembly including a plurality of valves respectively fluidly connected to the plurality of fluid inlets, the driven shaft releasably engaged with the plurality of valves and configured to activate and deactivate each of the plurality of valves;
a valve rod engaged with each one of the plurality of fluid inlets, wherein a flow area distance between each valve rod and respective plurality of inlets is proportional to a position of each valve rod over all operating positions of the valve rod;
wherein each of the plurality of valves includes a spring positioned between the driven shaft and the plurality of fluid inlets, the spring of each of the plurality of valves configured to produce a force when the valve is activated and produce a force when the valve is deactivated; and
a controller operably connected to the motor and programmed to activate and deactivate the plurality of valves by rotation of the driven shaft.

28. The multi-valve water treatment system of claim 27, wherein the common fluid flow chamber includes a floor and each of the respective plurality of fluid inlets includes a raised lip extending from the floor.

29. A multi-valve water treatment system comprising:
a motor;
a driven shaft drivingly coupled to the motor;
a fluid housing having a plurality of fluid inlets positioned to discharge to a common fluid flow chamber, and a fluid outlet positioned to receive a single flow from the fluid flow chamber, the common fluid flow chamber including a floor and each of the respective plurality of fluid inlets includes a raised lip extending from the floor, each of the plurality of fluid inlets coupled to a source of a water treatment substance;
a multi-valve assembly including a plurality of valves respectively fluidly connected to the plurality of fluid inlets, the driven shaft releasably engaged with the plurality of valves and configured to activate and deactivate each of the plurality of valves;
wherein each of the plurality of valves includes a spring positioned between the driven shaft and the plurality of fluid inlets, the spring of each of the plurality of valves configured to produce a force when the valve is activated and produce a force when the valve is deactivated; and
a controller operably connected to the motor and programmed to activate and deactivate the plurality of valves by rotation of the driven shaft.

30. A multi-valve water treatment system comprising:
a motor;
a driven shaft drivingly coupled to the motor;
a fluid housing having a plurality of fluid inlets positioned to discharge to a common fluid flow chamber, and a fluid outlet positioned to receive a single flow from the fluid flow chamber, each of the plurality of fluid inlets coupled to a source of a water treatment substance;
a multi-valve assembly including a plurality of valves respectively fluidly connected to the plurality of fluid inlets, the driven shaft releasably engaged with the plurality of valves and configured to activate and deactivate each of the plurality of valves;
a housing, wherein the multi-valve assembly and the driven shaft are at least partially disposed within the housing;
wherein each of the plurality of valves includes a spring positioned between the driven shaft and the plurality of fluid inlets, the spring of each of the plurality of valves configured to produce a force when the valve is activated and produce a force when the valve is deactivated;
wherein each of the plurality of valves further includes a valve actuator engaged with the driven shaft and a valve rod engaged with one of the plurality of fluid inlets;

wherein each valve actuator includes a concave groove and the housing includes correspondingly convex rails, the concave grooves and the convex rails configured to slidably engage with one another; and a controller operably connected to the motor and programmed to activate and deactivate the plurality of valves by rotation of the driven shaft.

31. A multi-valve water treatment system comprising:

a motor;

a driven shaft drivingly coupled to the motor;

a fluid housing having a plurality of fluid inlets positioned to discharge to a common fluid flow chamber, and a fluid outlet positioned to receive a single flow from the fluid flow chamber, each of the plurality of fluid inlets coupled to a source of a water treatment substance;

a multi-valve assembly including a plurality of valves respectively fluidly connected to the plurality of fluid inlets, the driven shaft releasably engaged with the plurality of valves and configured to activate and deactivate each of the plurality of valves;

wherein each of the plurality of valves includes a spring positioned between the driven shaft and the plurality of fluid inlets, the spring of each of the plurality of valves configured to produce a force when the valve is activated and produce a force when the valve is deactivated;

a controller operably connected to the motor and programmed to activate and deactivate the plurality of valves by rotation of the driven shaft;

a locator plate coupled to the driven shaft and a detector positioned to detect rotation of the locator plate, the detector operably coupled to the controller; and wherein the detector comprises a photosensor.

* * * * *